July 30, 1940.   W. L. McGRATH   2,209,926
TEMPERATURE CONTROL SYSTEM
Filed March 23, 1936   4 Sheets-Sheet 1

Inventor
William L. McGrath
By George H. Fisher
Attorney

William L. McGrath
By George H Fisher
Attorney

Patented July 30, 1940

2,209,926

UNITED STATES PATENT OFFICE 2,209,926

TEMPERATURE CONTROL SYSTEM

William L. McGrath, Minneapolis, Minn., assignor to Minneapolis-Honeywell Regulator Company, Minneapolis, Minn., a corporation of Delaware Application March 23, 1936, Serial No. 70,366

17 Claims. (Cl. 236—9)

This invention relates to temperature control systems. Conventional heating systems using space thermostats of the "on" and "off" type for controlling a heater for heating a space supply heat at substantially full capacity to the space upon a call for heat by the space thermostat and supply substantially no heat to the space when the space thermostat is satisfied. In other words, large amounts of heat are delivered to the space upon a call for heat and substantially no heat is delivered to the space when the space temperature is satisfied. Due to this intermittent supply of large amounts of heat to the space and due to the inherent lag or inertia of such heating systems, "overshooting" and "undershooting" of the space temperature is brought about.

It is known that by maintaining the temperature or pressure or rate of flow of the heating medium at a predetermined value so as to supply just the correct amount of heat to the space to satisfy the heating load on the system, the space temperature may be maintained at a desired value. Stated in another way, for a given heating load on the system the temperature or pressure or rate of flow of the heating medium may be adjusted to supply sufficient heat to the space to maintain the temperature of the space constant. It follows then that for every heating load on the system, there must be a corresponding temperature or pressure or rate of flow value of the heating medium to maintain the space temperature constant. Specifically, upon an increase in the heating load the temperature or pressure or rate of flow of the heating medium must be increased to supply additional heat to make up for the increase in the heating load. Likewise, for a decrease in the heating load the temperature or pressure or rate of flow of the heating medium must be decreased. Therefore, in order to make a completely automatic control system to adjust the temperature or pressure or rate of flow of the heating medium to maintain the space temperature constant in the manner outlined above, some means responsive to the load on the heating system is required for adjusting the temperature or pressure or rate of flow of the heating medium.

Means in the form of outdoor thermostats have been used to adjust the temperature of the heating fluid to attempt to vary the temperature thereof in accordance with varying heat losses from the space as caused by changes in outdoor temperature. At the best, these systems are only partially accurate in their control since they do not respond to other conditions that vary the heating load such as wind velocity, solar radiation, the heat retaining capacity of the space, opening and closing of doors and windows and body heat given off by persons congregating in the space.

It is, therefore, the prime object of this invention to provide a heating control system responding to changes in the heating load as caused by any or all variables to maintain the space temperature substantially constant.

It is found that when the heating load on the system is relatively small, there is a demand for heat only a relatively small percent of the total time and that when the heating load is great there is a demand for heat a relatively large percent of the total time. For every heating load there is a corresponding percent of time during which there is a demand for heat. Therefore, the period or percent of time during which there is a demand for heat forms an ideal indication of the heating load on the heating system. It follows, therefore, that adjusting the temperature or pressure or rate of flow of the heating medium in accordance with the percent of time that there is a demand for heat causes adjustment of the temperature or pressure or rate of flow of the heating medium in accordance with the load on the heating system.

It is, therefore, an object of this invention to provide a temperature control system for a heating means whereby the temperature or pressure or rate of flow of the heating medium is adjusted in accordance with the percent of time during which there is a demand for heat to maintain the space temperature at a substantially constant value.

The various manners in which this mode of operation is accomplished and the novel structure utilized form objects of this invention.

For a more thorough understanding of my invention reference is made to the accompanying specification, claims and drawings, in which drawings:

Figure 1:
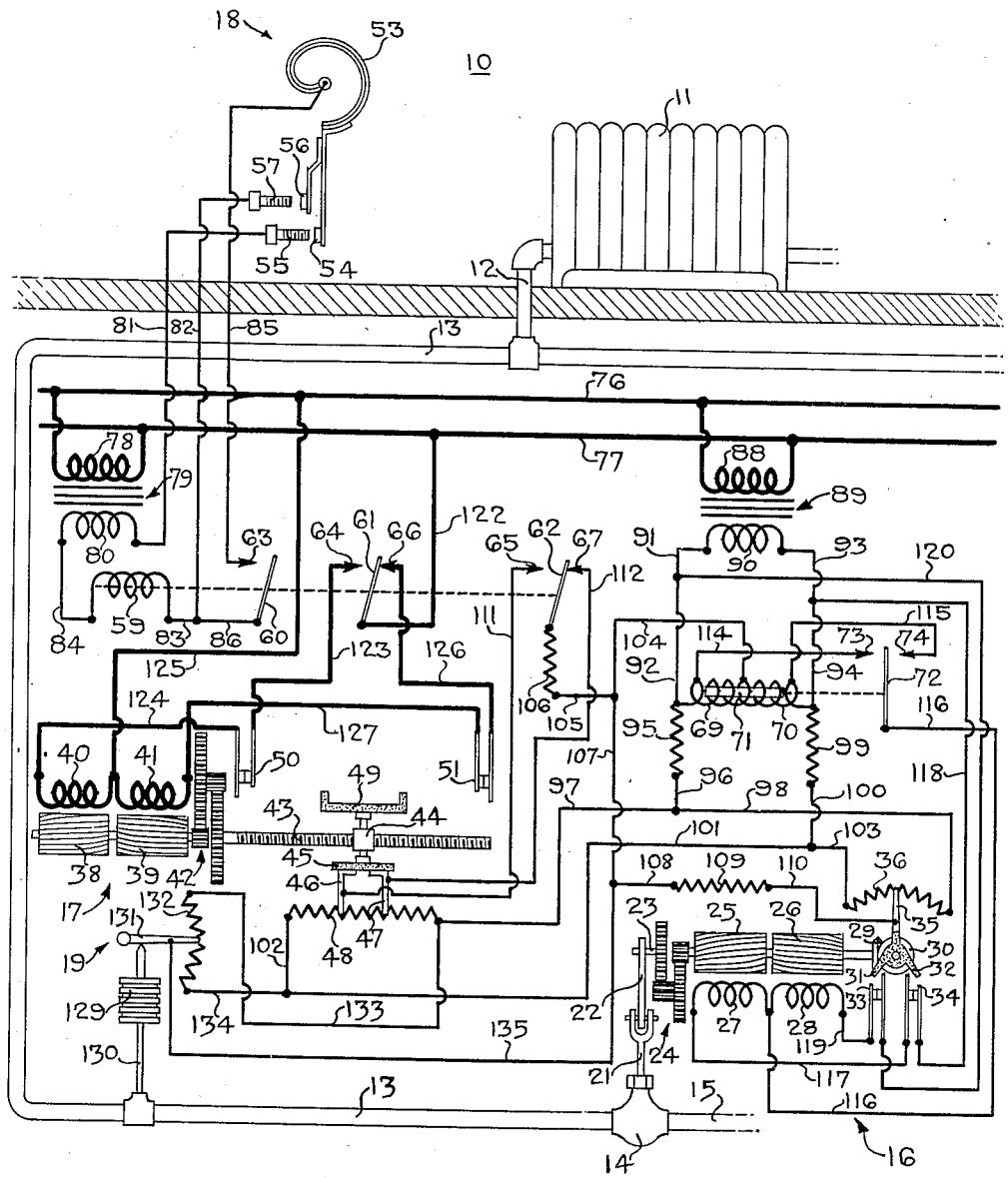
Figure 1 shows diagrammatically one form of my invention as applied to a space heating system utilizing a space thermostat for accomplishing the control function.

Referring now to Figure 1, I have designated a space, the temperature of which is to be controlled, at 10. The space may be heated by a radiator 11 which is connected to a riser 12 which in turn is connected to a header 13 which receives a supply of heating fluid from a supply pipe 15 under the control of a valve 14. The heating fluid delivered through the pipe 13 and riser 12 to the radiator 11 may be either steam or hot water.

The valve 14 is adapted to be operated by a motor 16, which may be of the proportioning type shown and described in application Serial No. 673,236 filed by Louis L. Cunningham on May 27, 1933, now Patent No. 2,160,400, dated May 30, 1939. The motor 16 is controlled by a second motor generally designated at 17, which is in turn controlled by a space thermostat generally designated at 18. If steam is used as the heating fluid and if the supply of steam may not be constant, a pressure controller generally designated at 19 may be used in combination with the motor 17.

The valve 14 is operated by a valve stem 21 which is connected by a pitman 22 to a crank pin 23 operated by the proportioning motor 16. The crank pin is operated through a reduction gear train 24 by motor rotors 25 and 26 upon energization of field windings 27 and 28, the arrangement being such that when the field winding 27 is energized the valve 14 is moved towards an open position and when the field winding 28 is energized the valve 14 is moved towards a closed position. The motor rotors 25 and 26 also operate a bevelled gear 29 which meshes with another bevelled gear 30. The bevelled gear 30 operates fingers 31 and 32, which are preferably made of insulating material, in such manner as to break contact between the contacts of limit switches 33 and 24 upon extreme opening or closing movements of the valve 14. The bevelled gear 30 also operates a slider 35 with respect to a balancing potentiometer coil 36. The arrangement is such that when valve 14 is moved towards an open position the slider 35 is moved to the right with respect to the balancing potentiometer coil 36 and when the valve 14 is moved towards a closed position, the slider 35 is moved to the left with respect to the balancing potentiometer coil 36. When the valve 14 is moved to a closed position the finger 31 opens the limit switch 33 and when the valve 14 is moved to an extreme open position the finger 32 opens the limit switch 34.

The motor generally designated at 17 comprises rotors 38 and 39 which are operated by the field windings 40 and 41 respectively. The rotors 38 and 39 operate through a reduction gear train generally designated at 42, to rotate an elongated screw 43. Mounted on the screw 43 is a nut 44 which carries a member 45, preferably made of insulating material. The member 45 in turn carries sliders 46 and 47 which are adapted to slide across a potentiometer coil 48. The nut 44 also carries an abutment member 49, preferably made of insulating material, which is adapted to engage and open limit switches 50 and 51. The arrangement is such that when the field winding 40 is energized the screw 43 is rotated in such direction as to move the nut 44 to the left, and when the field winding 41 is energized the screw 43 is rotated in the opposite direction to move the nut 44 to the right.

The space thermostat, generally designated at 18, may comprise a bimetallic element 53 for operating contacts 54 and 56 with respect to stationary contacts 55 and 57. The contacts 56 and 57 are spaced farther apart than contacts 54 and 55, so that upon a decrease in space temperature the contact 54 first engages the contact 55 and then the contact 56 engages the contact 57, and upon an increase in space temperature the engagement between the contacts 56 and 57 is broken first and then the engagement between contacts 54 and 55 is broken. For purposes of illustration, it is assumed that the contacts 54 and 55 make and break at substantially 72 degrees and that the contacts 56 and 57 make and break at substantially 70 degrees.

This form of the invention contemplates the use of a relay coil 59 for operating switch arms 60, 61 and 62. Upon energization of the relay coil 59, the switch arms 60, 61 and 62 are moved into engagement with contacts 63, 64 and 65 respectively. Upon deenergization of the relay coil 59 the switch arms 60, 61 and 62 are moved out of engagement with their respective contacts and the switch arms 61 and 62 are moved into engagement with contacts 66 and 67, this last movement of the switch arms 60, 61 and 62 being accomplished by means of springs, gravity or other means, not shown.

This invention also contemplates the use of a relay comprising relay coils 69 and 70 for influencing a core 71. The core 71 is suitably connected to a switch arm 72 which cooperates with spaced contacts 73 and 74. When the relay coil 69 is energized more than the relay coil 70, the switch arm 72 is moved into engagement with the contact 73. When the relay coil 70 is energized more than the coil 69, the switch arm 72 is moved into engagement with the contact 74, and when the relay coils 69 and 70 are equally energized, the switch arm 72 is maintained in a position midway between the contacts 73 and 74.

Line wires leading from source of power, not shown, are designated at 76 and 77. A primary 78 of a step-down transformer 79 having a secondary 80 is connected across the line wires 76 and 77. One end of the secondary 80 is connected by a wire 81 to the contact 55 of the space thermostat 18. The contact 57 thereof is connected by wires 82 and 83 to one end of the relay coil 59 and the other end of the relay coil 59 is connected by a wire 84 to the other end of the secondary 80. The bimetallic element 53 of the space thermostat 18 is connected by a wire 85 to the relay contact 63, and the switch arm 60 cooperating with the contact 63 is connected by a wire 86 to the junction of wires 82 and 83.

When the space temperature decreases to 72 degrees, the contact 54 is moved into engagement with the contact 55 and upon a further decrease in space temperature to a value illustrated at 70 degrees, the contact 56 is moved into engagement with the contact 57. This engagement of the contacts 56 and 57 completes a circuit from the secondary 80 through wire 81, contacts 55, 54, 56 and 57, wires 82 and 83, relay coil 59 and wire 84, back to the secondary 80. Completion of this circuit causes energization of relay coil 59 to move the switch arms 60, 61 and 62 into engagement with the contacts 63, 64 and 65. Movement of the switch arm 60 into engagement with the contact 63 completes a maintaining or holding circuit from the secondary 80 through wire 81, contacts 55 and 54, bimetallic element 53, wire 85, contact 63, switch arm 60, wires 86 and 83, relay coil 59 and wire 84, back to the secondary 80. This circuit maintains the relay coil 59 energized until such time as the space temperature shall rise to 72 degrees to break contact between the contacts 54 and 55.

A primary 88 of a step-down transformer 89 having a secondary 90 is also connected across the line wires 76 and 77. One end of the secondary 90 is connected by wires 91 and 92 to the left end of the relay coil 69, and the other end of the secondary 90 is connected by wires 93 and 94 to the right end of the relay coil 70, the other ends of the relay coils 69 and 70 being connected together. Therefore, the relay coils 69 and 70 are connected across the secondary 90. The left hand end of the coil 69 is also connected by a protective resistance 95 and wires 96, 97 and 98 to the right hand end of the potentiometer coil 48 and to the right hand end of the balancing potentiometer coil 36. In a like manner, the right hand end of the relay coil 70 is connected by a protective resistance 99 and wires 100, 101, 102 and 103 to the left hand end of the potentiometer coil 48 and the left hand end of the balancing potentiometer coil 36. The junction of the coils 69 and 70 is connected by wires 104 and 105 and a resistance 106 to the switch arm 62 operated by the relay coil 59. The junction of the coils 69 and 70 is also connected by wires 104, 107 and 108, a resistance 109 and a wire 110, to the slider 35 associated with the balancing potentiometer coil 36. The contact 65 associated with the switch arm 62 is connected by a wire 111 to the slider 46 and the contact 67 is connected by a wire 112 to the slider 47. From the above connections it is seen that the secondary 90, the relay coils 69 and 70, the potentiometer coil 48 and the balancing potentiometer coil 36, are all connected in parallel. Likewise, it is seen that the junction of coils 69 and 70, either of the sliders 46 and 47, and the slider 35 associated with the balancing potentiometer coil 36, are connected together.

The contact 73 is connected by wire 114 to a small number of turns of the relay coil 69 and the contact 74 is connected by a wire 115 to a small number of turns of the relay coil 70. The switch arm 72 is connected by a wire 116 to the junction of the field windings 27 and 28 of the proportioning motor 16. The field winding 27 is connected by a wire 117 to the limit switch 34, which in turn is connected by wires 118 and 93 to one end of the secondary 90. Likewise, the field winding 28 is connected by a wire 119 through the limit switch 33 and wires 120 and 91 to the other end of the secondary 90.

Upon a call for heat by the space thermostat 18 so as to energize the relay coil 59 to move the switch arm 62 into engagement with the contact 65, a circuit is completed from the junction of the relay coils 69 and 70 through wires 104 and 105, resistance 106, switch arm 62, contact 65, wire 111, slider 46, the left hand end of the potentiometer coil 48, wires 102, 101 and 100, and protective resistance 99, to the relay coil 70. Due to the parallel relationship pointed out above, completion of this circuit causes partial short-circuiting of the relay coil 70 by reason of the fact that the resistance in the potentiometer coil 48 is less at the left hand end thereof than at the right hand end thereof when the slider 46 is placed in communication with the junction of the relay coils 69 and 70 by movement of the switch arm 62 into engagement with contact 65. This partial short-circuiting of the relay coil 70 decreases the energization thereof and increases the energization of the relay coil 69 to move the switch arm 72 into engagement with the contact 73. This causes completion of a circuit from the secondary 90 through wires 91 and 92, a small number of turns of the relay coil 69, wire 114, contact 73, switch arm 72, wire 116, field winding 27, wire 117, limit switch 34, and wires 118 and 93, back to the secondary 90. Completion of this circuit causes energization of the field winding 27 to move the valve 14 towards an open position.

Movement of the valve 14 towards an open position causes right hand movement of the slider 35 with respect to the balancing potentiometer coil 36, and due to the parallel relationship pointed out above, a circuit is completed from the junction of the relay coils 69 and 70 through wires 104, 107 and 108, resistance 109, wire 110, slider 35, the right hand end of the balancing potentiometer coil 36, wires 98 and 96, and protective resistance 95 to the relay coil 69, to cause partial short-circuiting of the relay coil 69 to decrease the energization thereof and increase the energization of the relay coil 70. It will be remembered at this point that the energization of the relay coil 69 was increased more than the energization of the relay coil 70 by movement of the switch arm 62 into engagement with the contact 65. When the slider 35 has moved sufficiently far to the right so as to rebalance the energizations of the coils 69 and 70, the switch arm 72 is moved out of engagement with the contact 73 to the mid position shown in the drawings, to break the circuit through the field winding 27 to stop further opening movement of the valve 14.

Movement of the valve 14 towards an open position in this manner increases the heating fluid admitted to the heat exchanger or radiator 11 in the space 10 to raise the temperature of the space. When the space temperature has been increased to 72 degrees, as illustrated, the relay coil 59 is deenergized to move the switch arm 62 out of engagement with the contact 65 and into engagement with the contact 67. Movement of the switch arm 62 into engagement with the contact 67 completes a partial shunt circuit from the junction of the coils 69 and 70 through wires 104 and 105, resistance 106, switch arm 62, contact 67, wire 112, slider 47, the right hand end of the potentiometer coil 48, wires 97 and 96, and protective resistance 95 to the relay coil 69. When the switch arm 62 is moved into engagement with the contact 67, the slider 47 is placed in control and since the resistance through the right hand end of the potentiometer coil 48 is less than the resistance through the left hand end thereof, completion of this circuit causes partial short-circuiting of the relay coil 69 to decrease the energization thereof and increase the energization of the coil 70. Increasing the energization of the coil 70 in this manner causes movement of the switch arm 72 into engagement with the contact 74 to complete a circuit from the secondary 90 through wires 93 and 94, a small number of turns of relay coil 70, wire 115, contact 74, switch arm 72, wire 116, field winding 28, wire 119, limit switch 33, and wires 120 and 91, back to the secondary 90. Completion of this circuit causes energization of the field winding 28 to move the valve 14 towards a closed position.

Movement of the valve 14 towards a closed position causes left hand movement of the slider 35 with respect to the balancing potentiometer coil 36 to complete a partial shunt circuit from the junction of relay coils 69 and 70, through wires 104, 107 and 108, resistance 109, wire 110, slider 35, the left hand end of the balancing potentiometer coil 36, wires 103 and 100, and protective resistance 99, to the relay coil 70. Completion of this circuit causes partial short-circuiting of the relay coil 70 to decrease the energization thereof and increase the energization of the relay coil 69, it being remembered that the relay coil 70 was energized more than the relay coil 69 by movement of the switch arm 62 into engagement with the contact 67. When the slider 35 has moved sufficiently far to the left to re-balance the energizations of the relay coils 69 and 70, the switch arm 72 is moved out of engagement with the contact 74 to the mid position shown in the drawings, which breaks the circuit through the field winding 28 to stop further closing movement of the valve 14. Movement of the valve 14 towards a closed position in this manner decreases the supply of heat to the space 10.

In this manner the valve 14 is moved towards an open position upon a call for heat from the space thermostat 18 and is moved towards a closed position when the space thermostat 18 is satisfied, the amount of opening and closing movement being fixed by the position of the sliders 46 and 47. Movement of the slider 46 towards the left would cause greater opening movement, and movement of the slider 47 to the right would cause greater closing movement. With the sliders 46 and 47 fixed with respect to each other, the amount of opening movement and the amount of closing movement is constant. This amount may be varied by adjusting the sliders 46 and 47 with respect to each other.

It will be noted that the circuits through the field windings 27 and 28 of the motor 16 are completed through the limit switches 33 and 34 and through a small number of turns of the relay coils 69 and 70. Therefore, the circuits through the field windings 27 and 28 are broken if the valve 14 should be moved to either extreme open or closed position. Also the passing of the circuit through a small number of turns of the relay coils 69 and 70 increases the energization of these coils respectively, forcibly maintaining the switch arm 72 in engagement with the contacts 73 or 74 to prevent relay chatter.

By reason of the above described construction and mode of operation, a predetermined amount of heat is being delivered to the space 10 when the space thermostat is satisfied, to maintain the space temperature at the desired value, and when the space temperature decreases so that the space thermostat 18 calls for heat a slightly larger amount of heat is delivered to the space 10 during the period of call for heat. The difference in the amounts of heat delivered to the space 10, depending upon whether the space thermostat is satisfied or calling for heat, is determined by the relative positions of the sliders 46 and 47. In order to adjust the amount of heat delivered to the space 10 in accordance with changes in the heating load, the motor 17 is utilized for operating the sliders 46 and 47 to the left or right with respect to the potentiometer coil 48. Since, as pointed out above, the per cent of total time that the space thermostat is calling for heat forms a good indication of the heating load, I utilize the motor 17, which continually operates in one direction or the other, for moving the sliders 46 and 47 to the left or right with respect to the potentiometer coil 48. Movement of the sliders 46 and 47 to the left causes partial short-circuiting of the relay coil 70 to move the valve 14 towards an open position to supply more heat to the space 10. Likewise, movement of the sliders 46 and 47 to the right causes partial short-circuiting of the relay coil 69 to move the valve 14 towards a closed position to supply less heat to the space 10.

Upon a demand for heat by the space thermostat 18 so as to energize the relay coil 59, the switch arm 61 is moved into engagement with the contact 64 to complete a circuit from the line wire 77 through wire 122, switch arm 61, contact 64, wire 123, limit switch 50, wire 124, field winding 40 and wire 125, back to the other line wire 76. Completion of this circuit causes energization of the field winding 40 to move the nut 44 to the left, and consequently the sliders 46 and 47 to the left. Therefore, the valve 14 is not only opened the predetermined amount, as determined by the movement of the switch arm 62 into engagement with the contact 65, but the valve 14 is moved further towards an open position by the left hand movement of the slider 46. When the space temperature rises to 72 degrees to deenergize the relay coil 59, the switch arm 61 is moved into engagement with the contact 66 to complete a circuit from line wire 77, through wire 122, switch arm 61, contact 66, wire 126, limit switch 51, wire 127, field winding 41 and wire 125, back to the line wire 76. Completion of this circuit causes energization of the field winding 41 to move the nut 44 to the right, and consequently to move the sliders 46 and 47 to the right. Therefore, when the space temperature is slightly above the desired value, indicating that there is no longer a demand for heat, the valve 14 is not only moved the predetermined distance towards the closed position as the result of movement of the switch arm 62 into engagement with the contact 67, but is moved further towards a closed position by the movement of the slider 47 to the right with respect to the potentiometer coil 48.

It is seen that when the space thermostat is calling for heat, the valve 14 is moved continuously towards an open position to increase the supply of heat to the space and that when the space thermostat 18 is satisfied the valve 14 is continually moved towards a closed position to supply less heat to the space 10. Since the thermostat 18 maintains the relay coil 59 energized a relatively great per cent of the total time when the heating load is great, the nut 44 is moved towards the left a greater amount than towards the right. Likewise, when the heating load is relatively small so as to maintain the relay coil 59 energized a relatively small per cent of the total time, the nut 44 is moved towards the right a greater distance than towards the left. In this manner the nut 44 is positioned towards the left upon an increase in heating load and is positioned towards the right upon a decrease in heating load. When the heating load is increased, the valve 14 is moved farther towards an open position and when the heating load is decreased the valve 14 is moved farther towards a closed position. When substantially the correct amount of heat is being delivered to the space 10 for a given load condition movement of the nut 44 to the right will equal movement of the nut to the left, the net result being that the rate of heat delivery to the space is substantially constant at each limit. Also, under these conditions the valve 14 will be open the predetermined amount the same length of time it will be closed the predetermined amount whereby equal heat increasing and heat decreasing periods will be obtained. In this manner the correct amount of heat is delivered to the space 10 to maintain the temperature thereof absolutely within predetermined limits, the rate of heat supply being adjusted with changes in the heating load.

The above structure and mode of operation gives satisfactory results as long as the steam pressure is maintained at a constant value. However, it is often the case that the steam pressure of a steam heating system such as disclosed in Figure 1 is not constant at all times. Since the amount of heat delivered to a space is dependent upon the steam pressure, it is desirable to maintain constant predetermined steam pressures in order to obtain an accurate control of the space temperature. A pressure regulator could be installed in the supply pipe 15 upstream of the valve 14 and satisfactory operation would be obtained. By utilizing the pressure regulator downstream of the valve 14 and generally designated at 19, constant predetermined steam pressures are not only provided but accurate calibration of the valve 14 is not required. The pressure regulator 19 may comprise a bellows 129 connected by a pipe 130 to the steam pipe 13 downstream of the valve 14. The bellows 129 is adapted to operate a slider 141 with respect to a potentiometer coil 132, the arrangement being such that as the steam pressure in the pipe 13 increases, the slider 131 is moved upwardly with respect to the potentiometer coil 132 and as the steam pressure decreases, the slider 131 is moved downwardly with respect to the potentiometer coil 132. The upper end of the potentiometer coil 132 is connected by a wire 133 to the right hand end of the potentiometer coil 48, the lower end of potentiometer coil 132 is connected by a wire 134 to the junction of wires 101 and 102, and the slider 131 is connected by a wire 135 to the junction of wires 107 and 108. It is, therefore, seen that the potentiometer coil 132 is connected in parallel with the secondary 90, relay coils 69 and 70, the balancing potentiometer coil 36 and the potentiometer coil 48. It is also seen that the slider 131 is connected to the slider 35 of the balancing potentiometer coil 36, to the junction of the relay coils 69 and 70, and to either sliders 46 or 47 associated with the potentiometer coil 48.

Omitting for the time being the operation of the sliders 46 and 47 and the potentiometer coil 48, movement of the slider 131 upwardly as a result of an increased steam pressure in the pipe 13 causes a partial short-circuiting of the relay coil 69 to decrease the energization thereof and increase the energization of the relay coil 70 to move the valve 14 towards a closed position. Movement of the valve 14 towards a closed position decreases the energization of the relay coil 70 and increases the energization of the relay coil 69 to rebalance the energizations thereof in the manner pointed out above. Therefore, the amount of closing movement of the valve 14 is proportional to the pressure increase in the pipe 13. Movement of the slider 131 downwardly as a result of a decrease in steam pressure in the pipe 13 causes partial short-circuiting of the relay coil 70 to decrease the energization thereof and increase the energization of the relay coil 69 to cause movement of the valve 14 towards an open position. Movement of the valve 14 towards an open position causes partial short-circuiting of the relay coil 69 to decrease the energization thereof and to increase the energization of the relay coil 70, and when the energizations of the relay coils 69 and 70 are rebalanced further movement of the valve 14 towards an open position is prevented. In this manner the valve 14 is positioned in accordance with the steam pressures in the pipe 13 to maintain constant predetermined pressures in the pipe 13.

When the pressure controller 19 is utilized in the system disclosed in Figure 1, the resistance 106 in series with the sliders 46 and 47 operated by the motor 17 is used to decrease the sensitivity of the potentiometer operated by the motor 17 whereby the controller 19 becomes the main control and the motor 17 becomes a compensating control. The operation of the motor 17 as a compensating control is identical with that outlined above for the main control, with the exception that the motor 17 operates to adjust the effective control point of the pressure controller 19 whereby the effective pressure setting of the pressure controller 19 is varied in accordance with changes in the heating load on the system. The resistance 109 in series with the slider 35 of the balancing potentiometer is provided to decrease the sensitivity of the balancing potentiometer whereby full range movements of the controller 19 and the motor 17 are required to move the valve 14 to either extreme position. By reason of the construction shown in Figure 1, utilization of the pressure controller 19 maintains constant predetermined pressure conditions in the steam pipe 13 and the values of these pressures may be adjusted in accordance with the per cent of total time that the thermostat is calling for heat, that is, the heating load on the heating system. If constant steam pressures are assured there is no need for the pressure controller 19 and, therefore, the system described above may be utilized to obtain an accurate temperature control.

Figure 2:
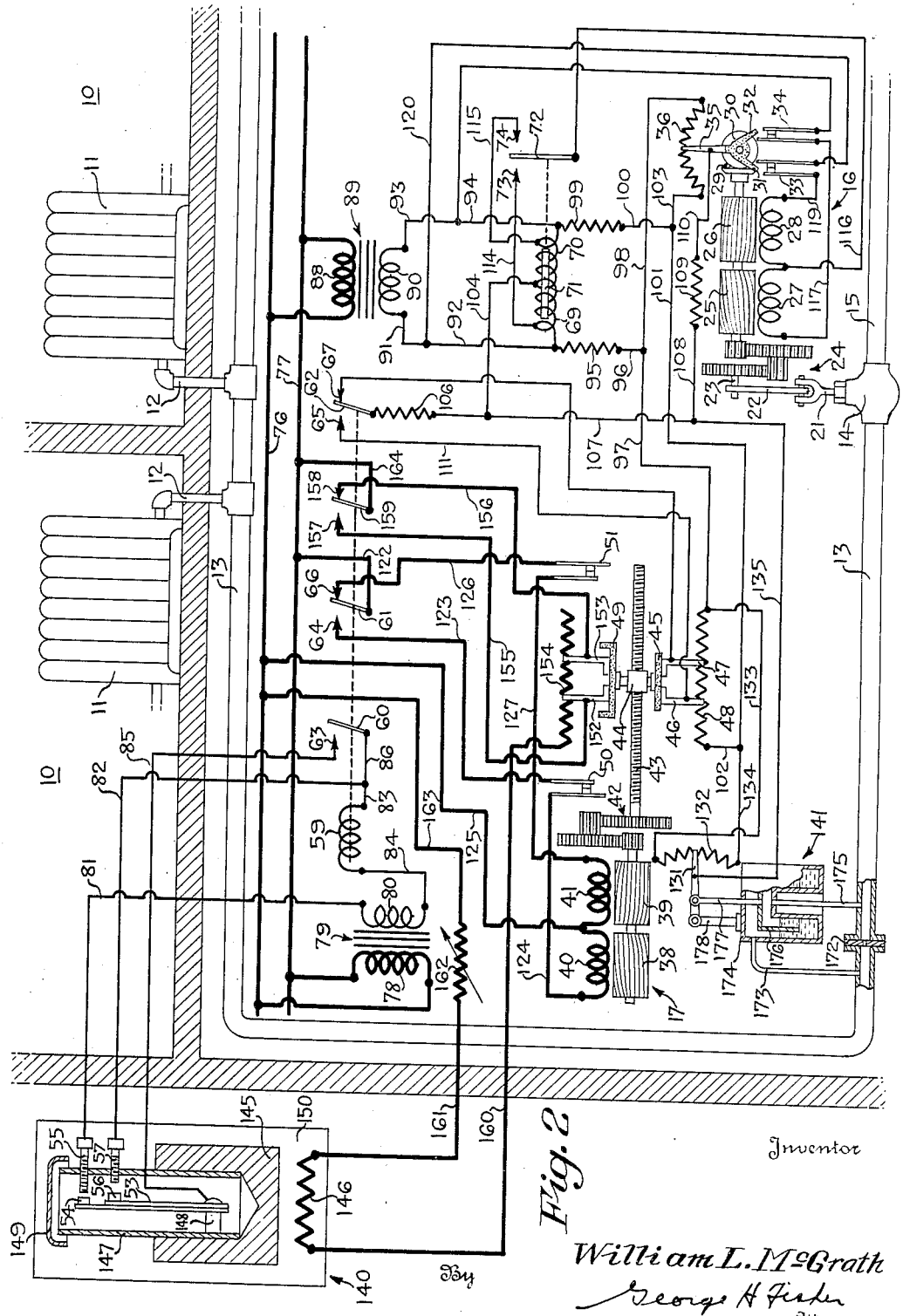
Figure 2 is a diagrammatic illustration of another form of my invention similar to that disclosed in Figure 1 but utilizing an outdoor controller for controlling the operation of the system.

Referring now to Figure 2, I have disclosed the same general heating system for maintaining the space temperature at the desired value, as in Figure 1. The heating system utilizes a valve 14 for controlling the supply of heating fluid, such as steam, through a pipe 13 and risers 12 to heat exchangers or radiators 11 located in spaces to be heated 10. The valve 14 of this form of my invention is operated by a proportioning motor 16 in the same manner outlined in the modification disclosed in Figure 1. The proportioning motor 16 is controlled by the motor 17 in exactly the same manner. Instead of utilizing a space thermostat responsive to the temperature of the space to be heated for determining the per cent of total time that there is a demand for heat, I utilize in this modification an outdoor controller generally designated at 140, which may be of the type shown and described in application, Serial No. 512,887, filed by Daniel G. Taylor on February 2, 1931, now Patent No. 2,065,835, dated Dec. 29 1936. The outdoor controller 140 is shown to comprise a mass which may take the form of a metallic block 145 which is hollowed out to receive a container 147 in which a bimetallic element 53 is mounted on a post 148. The bimetallic element 53 operates contacts 54 and 56 with respect to contacts 55 and 57 in the same manner that the bimetallic 53 of the space thermostat 18 of Figure 1 operates these contacts. The container 147 is closed at the top by a cover 149 so that the bimetallic element 53 responds to the temperature of the block 145 in the same manner that the bimetallic element 53 of Figure 1 responds to the temperature of the space 10 of Figure 1. The block 145 is heated by a heater 146 and is cooled by the outdoor atmosphere at a rate dependent upon outdoor temperatures, wind velocity and solar radiation. The elements so far described, comprising the outdoor controller 140, may be suitably mounted in a housing 150 to protect the same from the elements.

The system, utilizing the outdoor controller disclosed in the above referred to Taylor application, comprises an outdoor controller responsive to outdoor atmospheric conditions, including temperature, wind velocity and solar radiation, for controlling the temperature within the building. Heating means are provided in the building for supplying heat to the building and heating means are also supplied in the outdoor controller for supplying heat to the outdoor controller. The two heating means are proportioned according to the heat losses from the building and from the outdoor controller. A thermostatic device is provided for responding to the temperature within the outdoor controller and when this thermostatic device calls for heat both of the heating means are energized to deliver heat to the building and to the outside controller. Due to the proportional relationship of the heating means within the heat losses of the building and the outside controller, a definite temperature is maintained in the building and the outside controller so that by responding to the temperature of the outside controller the thermostatic device maintains a substantially constant or normal temperature within the building. Therefore, the thermostatic means in the outdoor controller responds to a demand for heat to operate the building heating means, and when the load conditions of the building are great the outdoor controller is demanding heat a relatively great per cent of the total time, and when the heating load of the building is relatively small the outdoor controller is calling for heat only a relatively small per cent of the total time.

The outdoor controller of the Taylor application may be utilized in my invention for determining the per cent of total time that there is a demand for heat, providing the heat supply to the outdoor controller is adjusted in the same manner that the heat supply to the building is adjusted, in order that the proportional relationship required for the satisfactory operation of the Taylor system may be maintained. In order to so adjust the heat supply to the outdoor controller 140, I have provided sliders 152 and 153 mounted on the insulating abutment member 49, and the sliders 152 and 153 are adjustably mounted as are the sliders 46 and 47. Sliders 152 and 153 are adapted to slide across a resistance 154. The sliders 152 and 153 are connected by wires 155 and 156 to contacts 157 and 158, which are adapted to be engaged by a switch arm 159, the switch arm 159 being operated by the relay coil 59. Upon energization of the relay coil 59, the switch arm 159 is moved into engagement with the contact 157 and upon deenergization thereof the switch arm 159 is moved into engagement with the contact 158. The resistance 154 is connected by a wire 160 to one end of the heater 146 located in the outdoor controller 140. The other end of the heater 146 is connected by a wire 161, a variable resistance 162 and a wire 163 to the line wire 76. The switch arm 159 is connected by a wire 164 to the other line wire 77. When the switch arm 159 is moved into engagement with the contact 157, the slider 152 is placed in control, and when the switch arm 159 is moved into engagement with the contact 158, the slider 153 is placed in control.

Upon a call for heat by the outdoor controller 140 so as to energize the relay coil 59, the switch arm 62 is moved into engagement with the contact 65 to increase the supply of heat to the spaces 10 in the manner pointed out with respect to Figure 1, and the switch arm 159 is moved into engagement with the contact 157 to complete a circuit from line wire 77 through wire 164, switch arm 159, contact 157, wire 155, slider 152, resistance 154, wire 160, heating element 146, wire 161, variable resistance 162 and wire 163, back to the other line wire 76. Completion of this circuit causes energization of the heater 146 to raise the temperature of the block 145. When the temperature of the block 145 has risen to such a value as to deenergize the relay coil 59, the switch arm 62 is moved into engagement with the contact 67 to supply a reduced amount of heat to the space in the manner pointed out with respect to Figure 1, and the switch arm 159 is moved into engagement with the contact 158 to complete a circuit from the line wire 77 through wire 164, switch arm 159, contact 158, wire 156, slider 153, resistance 154, wire 160, heater 146, wire 161, variable resistance 162, and wire 163, back to the other line wire 76. The heater 146 is maintained energized by this circuit but at a lesser rate by reason of the increase in resistance afforded by placing the slider 153 in control instead of the slider 152. Therefore, upon a call for heat by the outdoor controller, the heating element 146 is energized at a relatively high rate, and when the outdoor controller is satisfied the heater is energized at a relatively lower rate. The difference in rate at which the heater is energized is dependent upon the relative positions of the sliders 152 and 153. By adjusting the sliders 152 and 153 with respect to the sliders 46 and 47, the relative amounts of heat delivered to the outdoor controller 140 and to the spaces 10 may be adjusted to maintain the proportional relationship outlined above for the satisfactory operation of the control system.

Upon a call for heat by the outdoor controller, the switch arm 61 is moved into engagement with the contact 64 to operate the motor 17 to increase the heat supply to the spaces 10 in the manner pointed out with respect to Figure 1, and also increases the supply of heat to the outdoor controller 146 by the left hand movement of the slider 152. Likewise, when the outdoor controller 140 is satisfied, the switch arm 61 engages the contact 66 to operate the motor 17 to decrease the supply of heat to the spaces 10 in the manner pointed out with respect to Figure 1, and also decreases the supply of heat to the outdoor controller 140 by reason of the right hand movement of the slider 153. The heat input to the outdoor controller 140 is controlled in exactly the same manner as the heat input to the building, therefore, establishing and maintaining the proportional relationship which permits the control of the building heating means by the outdoor controller 140. Both means for supplying heat to the spaces 10 and to the outdoor controller 140 are controlled in accordance to the per cent of total time that there is a demand for heat and consequently the spaces 10 are maintained at the desired temperature regardless of changes in the heating load as caused by changes in outdoor temperature, wind velocity and solar radiation. Like reference characters have been used throughout Figures 1 and 2 where like elements are used. As in the preceding modification, the nut 44 will be moved an equal amount in both directions when the correct amount of heat is being delivered to the building, whereby equal heat increasing and decreasing periods are obtained.

It has been found that even with a substantially constant source of steam pressure, the rate of flow of steam through the control valve 14 may not be constant and may vary. These variations in rate of flow may be attributed to changes in steam supply pressures, to changes in rate of condensation in the heating system which results in varying outlet pressures at the valve, to the condition of the heating system just as the valve is opened to a greater extent depending upon whether the system is full or only partially full of steam, to the frequency of operation of the valve, to the length of time in which the valve is maintained in a valve opening position, and to other causes. Therefore, a valve which controls the supply of steam to a heating system does not necessarily admit twice as much steam when the valve is moved to a given position, say twenty minutes, than when the valve is moved to the same position for only ten minutes. It is, therefore, desirable, when an extremely accurate temperature control is needed, to utilize a flow regulator generally designated at 141, for maintaining predetermined constant rates of flow of steam to the heat exchangers in the spaces 10, and to adjust these rates of flow of heating fluid to the heat exchangers in accordance with the heating load on the heating system. For this purpose, I have provided a flow regulator generally designated at 141, which may comprise an orifice 172 in the pipe 13, the downstream side of the orifice 172 being connected by a pipe 173 to the upper portion of an enclosed chamber 174, and the upstream side of the orifice 172 being connected by a pipe 175 to the lower portion of the enclosed chamber 174. Located in the enclosed chamber 174 is an inverted bell 176 which is sealed by liquid, therefore, forming two pressure chambers, one above the bell 176 and the other below or in the bell. The bell 176 is connected by a rod 177 to the slider 131, which may be pivoted on a bracket 178. Flow regulators of this type are old in the art and a specific description thereof is not considered necessary, it being sufficient to state that as the flow of heating medium through the pipe 13 increases, the slider 131 is moved upwardly with respect to the potentiometer coil 132 and as the flow of heating medium decreases, the slider 131 is moved downwardly. The slider 131 and the potentiometer coil 132 are connected into the control system in the same manner as the slider 131 and the potentiometer coil 132 of the pressure regulator 19 of Figure 1 are connected into the control system. Therefore, in this modification the flow regulator 141 operates to maintain predetermined rates of flow of heating medium in the pipe 13 and these rates of flow of heating medium are adjusted in accordance with the demand for heat, to maintain the space temperature at the desired value regardless of changes in the heating load.

Therefore, in this modification I have provided a temperature control system wherein the space temperature is maintained at a desired value regardless of changes in the heating load and wherein the heating system is adjusted in accordance with the per cent of time during which there is a call for heat. I utilize the outdoor controller in this modification for determining the per cent of total time that there is a demand for heat, since in large buildings it is often difficult to find or locate a suitable place for a control thermostat which will indicate the average temperature condition of the building. Therefore, in large buildings of this type it may be preferable to use the outdoor controller 140 for controlling the heating system in the manner indicated in Figure 2, but where an average location may be found in an ordinary size building the space thermostat 18 of Figure 1 may be utilized. I have also provided in this modification a means responsive to the condition of the heating medium (rate of flow of the heating medium) for maintaining the condition of the heating medium at desired values and adjusting these values in accordance with the per cent of time that there is a demand for heat in order to maintain the space temperature at the desired value regardless of changes in the heating load.

Figure 3:
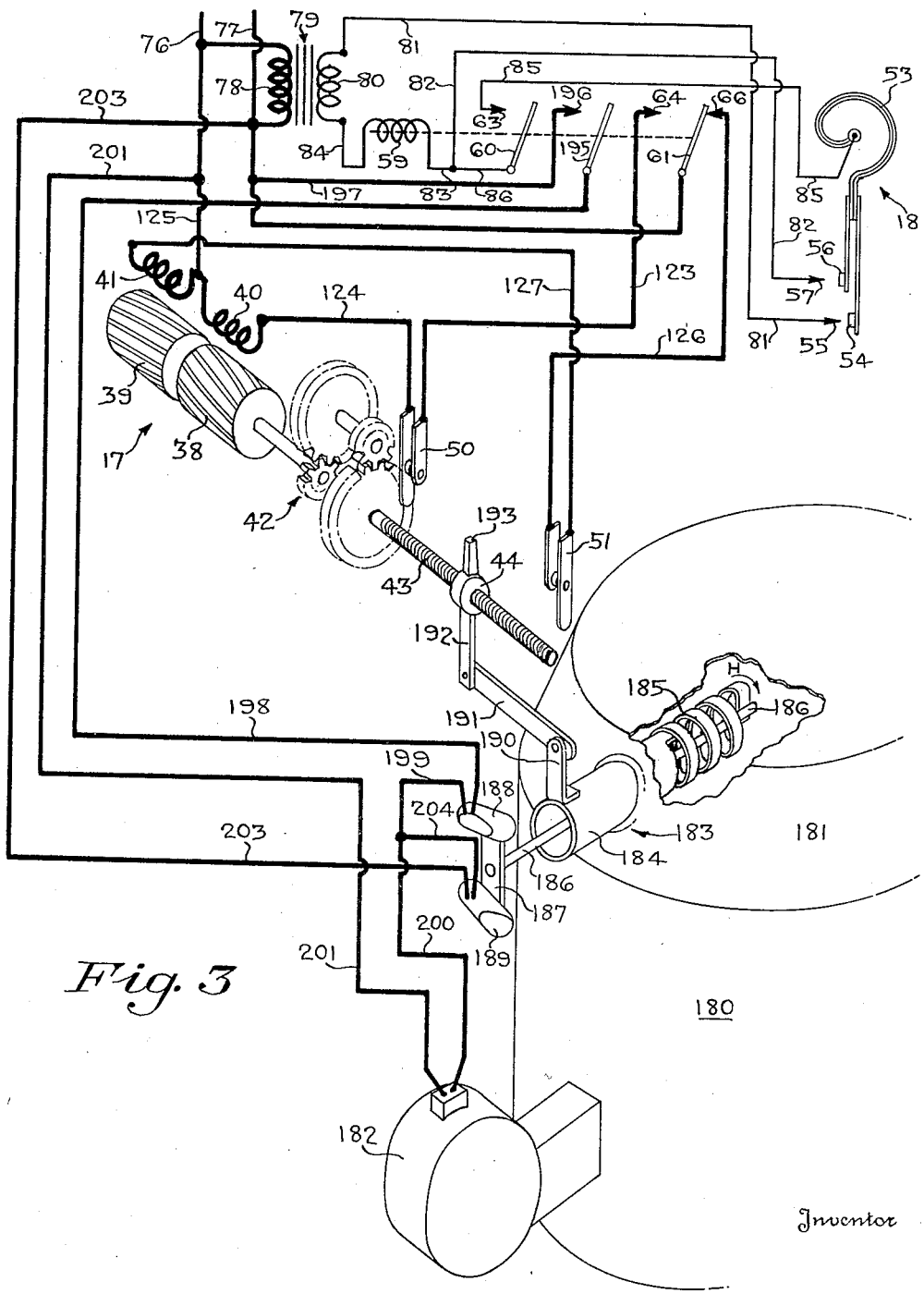
Figure 3 is a diagrammatic illustration of a modified form of my invention which also utilizes a space thermostat for performing the control function.

Referring now to Figure 3, I have disclosed a modified form of my invention for controlling original heating equipment that is intermittently operated, as distinguished from proportioning equipment, as disclosed in Figures 1 and 2. The means responding to the per cent of total time that there is a demand for heat is the same as that of Figure 1 and may comprise the space thermostat 18 for controlling the operation of the motor 17 in exactly the same manner as in Figure 1. Like reference characters have been used for designating the elements of the space thermostat 18, the motor 17, and the connections therebetween.

I have shown this form of my invention applied to a hot air furnace 180 having a bonnet 181 and fired by an oil burner 182. Located in the bonnet 181 is a temperature responsive device generally designated at 183. The temperature responsive device 183 responds to the bonnet temperature of the hot air furnace 180, and may comprise a sleeve 184 rotatably mounted in the bonnet and to which is secured one end of a bimetallic helix 185. The other end of the bimetallic helix is connected to a torque rod 186 which extends through the sleeve 184 and has secured on the outer end thereof a bracket 187. The bracket 187 carries mercury switches 188 and 189, the mercury switch 188 performing a high limit function and the mercury switch 189 performing a low limit function. The arrangement is such that upon an increase in bonnet temperature, the bracket 187 is rotated in a clockwise direction, and upon decrease in bonnet temperature, the bracket 187 is rotated in a counterclockwise direction. The mercury switches 188 and 189 are so positioned with respect to each other that upon a decrease in temperature to a predetermined value the mercury switch 189 is moved to a circuit making position and upon an increase in temperature a predetermined amount above said predetermined value the mercury switch 188 is moved to a circuit breaking position, and this difference in temperatures may be illustrated as 20 degrees.

The sleeve 184 is rotatably adjusted by a lever 190 which is connected by a pitman 191 to a bracket 192 suitably secured to the nut 44 operated by the motor 17. The nut 44 also carries an abutment 193 which is adapted to engage the limit switches 50 and 51 at either extreme position of the nut 44. When the nut 44 is moved towards the right, the sleeve 184 is rotated in a clockwise direction to lower the temperature setting of the thermostat 183, and when the nut 44 is moved to the left, the sleeve 184 is rotated in a counter-clockwise direction to raise the setting of the thermostat 183.

Relay coil 59 in addition to controlling the switch arm 61 with respect to contacts 64 and 66 for controlling the operation of the motor 17, also operates a switch arm 195 with respect to a contact 196, the arrangement being such that when the relay coil 59 is energized the switch arm 195 is moved into engagement with the contact 196. The contact 196 is connected by a wire 197 to the line wire 77 and the switch arm 195 is connected by a wire 198 to one of the electrodes of the high limit mercury switch 188. The other electrode of the mercury switch 188 is connected by wires 199 and 200 to the oil burner 182, which in turn is connected by a wire 201 to the other line wire 76. One of the electrodes of the low limit mercury switch 189 is connected by a wire 204 to the junction of wires 199 and 200, and the other electrode thereof is connected by a wire 203 to the line wire 77.

With the parts in the position shown in Figure 3, the bonnet temperature is assumed to be at such a value as to supply substantially the correct amount of heat to the space to maintain the space temperature at the desired value. As the bonnet temperature decreases, the mercury switch 189 is tilted to a circuit making position to complete a circuit from line wire 77 through wire 203, low limit mercury switch 189, wires 204 and 200, oil burner 182 and wire 201, back to the other line wire 76. Completion of this circuit causes operation of the oil burner to restore the bonnet temperature to the desired value. When the bonnet temperature has been restored to the desired value, the low limit mercury switch 189 is moved to a circuit breaking position to stop operation of the oil burner 182. In this manner the oil burner 182 is intermittently operated to maintain the bonnet temperature at the value determined by the setting of the switch 189, which value supplies an amount of heat to the space slightly less than that required to maintain the space temperature at the desired value.

When the space temperature decreases to 70 degrees, as illustrated in Figure 1, the relay coil 59 is energized to move the switch arm 195 into engagement with the contact 196 to complete a circuit from the line wire 77 through wire 197, contact 196, switch arm 195, wire 198, high limit mercury switch 188, wires 199 and 200, oil burner 182, and wire 201, back to the other line wire 76. Completion of this circuit causes energization of the oil burner 182 to raise the temperature of the heating medium in the bonnet 181 to supply additional heat to the space to restore the space temperature to the desired value, and when the bonnet temperature has been increased the twenty degrees, as illustrated, the mercury switch 188 is moved to a circuit breaking position to stop operation of the oil burner 182. When the bonnet temperature decreases as a result of stopping operation of the oil burner 182 to such a value as to move the high limit mercury switch 188 to a circuit making position the oil burner will be reenergized, providing the space thermostat is still calling for heat. Therefore, when the space thermostat is satisfied, the bonnet temperature is maintained at a predetermined temperature value, and when the space thermostat is calling for heat, the bonnet temperature is maintained at a predetermined higher temperature value, the difference in these temperature values being illustrated as 20 degrees.

Also in this modification, as in the previous modifications, when the space thermostat 18 is calling for heat, the switch arm 61 is moved into engagement with the contact 64 to cause left hand movement of the nut 44 to gradually raise the temperature setting of the thermostat 183, and when the space thermostat 18 is satisfied the switch arm 61 is moved into engagement with the contact 66 to move the nut 44 to the right to lower gradually the temperature setting of the bonnet thermosat 183. Since the per cent of total time that the thermostat is calling for heat varies in accordance with the heating load on the system, and since the nut 44 is moved towards the right upon a call for heat and towards the left when the space thermostat is satisfied, the nut 44 is positioned towards the right as the heating load increases and towards the left as the heating load decreases, in the same manner as pointed out with respect to Figures 1 and 2. Therefore, as the heating load increases the setting of the furnace thermostat 183 is raised and as the heating load decreases the setting of the thermostat 183 is lowered. In this manner a condition of equilibrium is established wherein the left hand movement of the nut 44 equals the right hand movement whereby the space temperature is maintained at the desired value in accordance with changes in the heating load. "Overshooting" and "undershooting" of the space temperature is thereby prevented.

Although in this modification, I have shown my invention as applied to a hot air furnace, the invention may equally as well be applied to a hot water system wherein the controller 183 could respond to the temperature of the hot water, or may also be used in connection with a steam or vapor system, and under such circumstances, the controller 183 would be responsive to steam or vapor pressures. In all instances the general mode of operation would be identical. Although I have disclosed in this modification an oil burner for the purpose of heating the space, other means may be provided, such as gas burner means, coal stoker means, or draft damper means, which require intermittent "on" and "off" operation.

Figure 4:
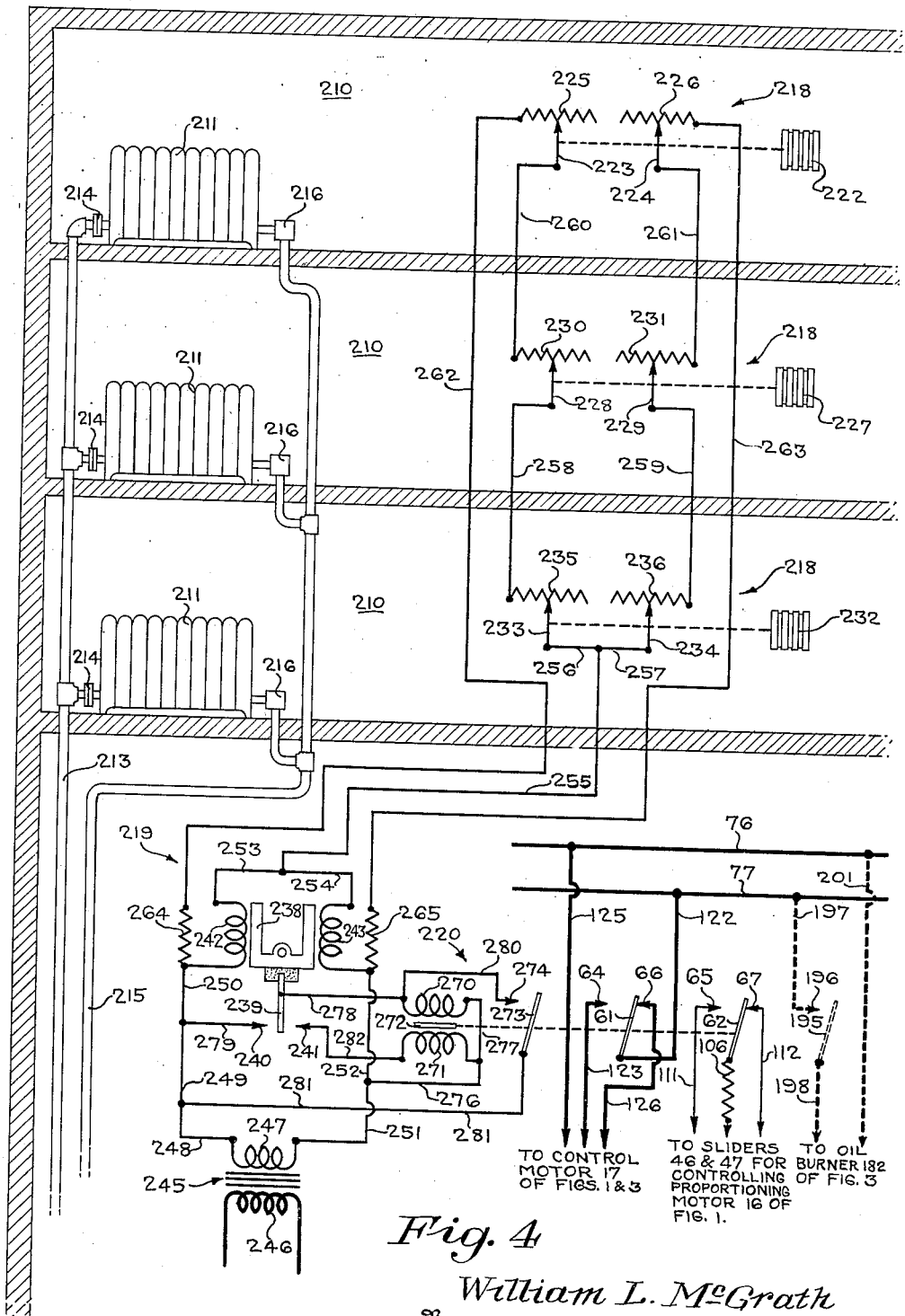
Figure 4 is a diagrammatic illustration of a control system that may be applied to the forms of the invention shown in Figures 1 and 3, whereby control in response to the average temperature of a building is obtained.

Referring now to Figure 4, I have disclosed a control system which may operate the control systems of Figures 1 or 3 in response to the per cent of time which the space temperature is calling for heat as determined by the per cent of time which the average temperature of a building is below the desired value. In other words, Figure 4 discloses an average temperature control system for controlling the systems of Figures 1 and 3.

A plurality of spaces of a building to be heated are generally designated at 210 and these spaces are each provided with radiators or heat exchangers 211 which receive a supply of heating fluid through pipes 213. The heating fluid may take the form of either steam or hot water. The supply of steam or hot water to each radiator 211 may be proportioned by suitable orifices 214 in a manner known in the art. Expended heating fluid is taken from radiator 211 through a pipe 215, and in case steam is used as the heating fluid, suitable steam traps 216 may be provided.

Steam or hot water may be delivered to the radiators 211 through the pipe 213 under the control of the valve 14 and the proportioning motor 16, as illustrated in Figure 1, or steam or hot water may be supplied to the radiators 211 from a boiler fired by an oil burner 182, as disclosed in Figure 3. Heating fluid in the form of hot air may be delivered to the spaces from the hot air furnace of Figure 3 if desired.

Each space 210 may be provided with a thermostatic control device generally designated at 218, which devices control a balanced relay generally designated at 219. The balanced relay 219 in turn may control another relay generally designated at 220, which in turn controls the control motor 17 and proportioning motor 16 of Figure 1, or which may control the control motor 17 and the oil burner 182 of Figure 3. The arrangement is such that when the average temperature within the building falls below a predetermined value, the heat supply to the spaces 210 is increased and when the average temperature of the building rises above that predetermined value, the supply of heat to the building is decreased. As shown in Figure 4, the relay 220 operates the switch arm 61 with respect to contacts 64 and 66 to control the control motor 17 in the same manner as shown in Figures 1 and 3. The relay 220 also operates the switch arm 62 with respect to contacts 65 and 67 to place the control of the proportioning motor 16 of Figure 1 under the control of either slider 46 or 47 in the manner pointed out with respect to Figure 1. If the control system of Figure 3 is to be utilized, the relay 220 may operate the switch arm 195 with respect to contact 196 of Figure 3 to control the oil burner 182 in the manner pointed out with respect to Figure 3.

The temperature controller 218 of the upper space 210 is shown to comprise a thermostatic bellows 222 for operating sliders 223 and 224 with respect to resistance coils 225 and 226. The temperature controller 218 of the middle space 210 is shown to comprise a thermostatic bellows 227 for operating sliders 228 and 229 with respect to resistances 230 and 231. The temperature controller 218 of the lower space 210 is shown to comprise a thermostatic bellows 232 for operating sliders 233 and 234 with respect to resistances 235 and 236. The arrangement of all of the temperature controllers 218 is such that when the temperatures of the spaces 210 increase the sliders are moved to the left with respect to their associated resistances and when temperature decreases the sliders are moved to the right with respect to their associated resistances.

The balanced relay 219 is shown to comprise a pivoted armature 238 carrying a switch arm 239 which cooperates with spaced contacts 240 and 241. The armature 238 is controlled by relay coils 242 and 243, the arrangement being such that when the coil 242 is energized more than the coil 243 the switch arm 239 is moved into engagement with the contact 240 and when the relay coil 243 is energized more than the coil 242 the switch arm 239 is moved into engagement with the contact 241.

A step-down transformer is generally designated at 245, the primary 246 of which is connected to some source of power, not shown. One end of the secondary 247 of the step-down transformer 245 is connected by wires 248, 249 and 250 to one end of the relay coil 242. The other end of the secondary 247 is connected by wires 251 and 252 to one end of the relay coil 243. The other ends of the relay coils 242 and 243 are connected together by wires 253 and 254 and to the sliders 233 and 234 of the lower temperature controller 218 by wires 255, 256 and 257. The resistances 235 and 236 are connected by wires 258 and 259 to the sliders 228 and 229. The resistances 230 and 231 associated with these sliders are connected by wires 260 and 261 to sliders 223 and 224. The resistances 225 and 226 associated with these sliders 223 and 224 are connected by wires 262 and 263 and protective resistances 264 and 265 to the first mentioned ends of the relay coils 242 and 243.

From these wiring connections, it is seen that the relay coils 242 and 243 are series connected across the secondary 247 and that the left hand resistances of the temperature controllers 218 are connected in series within one another and are connected in parallel with the relay coil 242, and that the right hand resistances of the temperature controllers 218 are connected in series with one another and are connected in parallel with the relay coil 243. By reason of these connections, movement of the sliders of the temperature controllers 218 to the left decreases the energization of the relay coil 242 and increases the energization of the relay coil 243. Movement of the sliders of the temperature controllers 218 toward the right decreases the energization of the relay coil 243 and increases the energization of the relay coil 242. With the parts in the position shown, the relay coils 242 and 243 are equally energized as the result of a desired average temperature being present in the building. In case any temperature controller 218 should move its sliders to the right in response to a decrease in temperature affecting the same, the relay coil 242 will become more highly energized than the relay coil 243 to move the switch arm 239 into engagement with the contact 240. In case any of the temperature controllers 218 should move its sliders to the left in response to an increase in temperature affecting the same, the relay coil 243 will become more highly energized than the relay coil 242 to move the switch arm 239 into engagement with the contact 241. From the above it is seen that when the average temperature of the building is at the desired value, the switch arm 239 is maintained midway between the contacts 240 and 241, as shown in the drawing, that if the average temperature should increase above the desired value the switch arm 239 is moved into engagement with the contact 241 and that if the average temperature of the building should decrease below the desired value the switch arm 239 is moved into engagement with the contact 240.

The relay 220 may comprise an energizing coil 270 and a bucking coil 271 for operating an armature 272 which operates a maintaining switch arm 273 with respect to a contact 274. The armature 272 may also operate the switch arms 61 and 62 of Figure 1, or the switch arms 61 and 195 of Figure 3. The arrangement is such that when the energizing coil 270 is energized the switch arms are moved to the left from the position shown in the drawing, and that when both the energizing coil 270 and the bucking coil 271 are energized or when neither coil 270 or 271 are energized, the switch arms are moved to the right to the position shown in the drawing by means of springs, gravity or other means, not shown.

Movement of the switch arm 239 of the balanced relay 219 into engagement with the contact 240 as a result of a decrease in the average temperature of the building, completes a circuit from the right hand end of the secondary 247 through wires 251, 276 and 277, energizing coil 270, wire 278, switch arm 239, contact 240 and wires 279, 249 and 248 back to the other end of the secondary 247. Completion of this circuit causes energization of the energizing coil 270 to move the switch arms 273, 61, 62 and 195 into engagement with their respective contacts 274, 64, 65 and 196. Movement of the switch arm 273 into engagement with the contact 274 completes a maintaining circuit for the energizing coil 270 from the right hand end of the secondary 247 through wires 251, 276 and 277, energizing coil 270, wire 280, cotnact 274, switch arm 273 and wires 281 and 248 back to the other end of the secondard 247. Completion of this maintaining circuit maintains the energizing coil 270 energized until such time as the switch arm 239 shall move into positive engagement with the contact 241. Movement of the switch arm 61 into engagement with the contact 64 as a result of energization of the energizing coil 270 causes gradual increasing of the pressure or rate of flow of the heating fluid in the manner described with respect to Figures 1 and 3. Movement of the switch arm 62 into engagement with the contact 65 as a result of energization of the energizing coil 270 increases immediately a predetermined amount the pressure or rate of flow of heating fluid in the manner pointed out with respect to Figure 1. Movement of the switch arm 195 into engagement with the contact 196 causes immediate operation of the oil burner 182 in the manner pointed out with respect to Figure 3. It follows then that movement of the switch arm 239 into engagement with contact 240 in response to a decrease in the average temperature causes the supply of additional heat to the spaces 210 in the building to restore the average temperature of the building to normal.

When the average temperature of the building rises slightly above normal, the switch arm 239 is moved into engagement with the contact 241 to complete a circuit from the right hand end of the secondary 247 through wires 251 and 276, bucking coil 271, wire 282, contact 241, switch arm 239, wires 278 and 280, contact 274, switch arm 273 and wires 281 and 248 back to the other end of the secondary 247. Completion of this circuit causes energization of the bucking coil 271 which counteracts the action of the energizing coil 270, whereby the switch arms 273, 61, 62 and 195 are moved to the right to the positions shown in the drawings. Movement of the switch arm 273 out of engagement with the contact 274 in this manner breaks the circuit through the bucking coil 271 and also the maintaining circuit through the energizing coil 270, whereby both coils 270 and 271 are deenergized and the switch arms remain in the position shown in the drawing. Movement of the switch arm 61 into engagement with the contact 66 operates motor 17 of Figures 1 and 3 in such a direction as to gradually decrease the supply of heat to the spaces. Movement of the switch arm 62 into engagement with contact 67 immediately decreases a predetermined amount the supply of heat to the spaces if the control system of Figure 1 is used. Movement of the switch arm 195 out of engagement with the contact 196 returns the control of the oil burner 182 to the low limit setting if the control system of Figure 3 is used. It follows then that when the average temperature in the building rises above a predetermined value, the supply of heat to the building is decreased a predetermined amount and the supply of heat is further gradually decreased as long as the average temperature remains above normal.

From the above it is seen that in this modification shown by Figure 4 I have not only provided a means whereby heat is supplied to a building in accordance with the per cent of total time that there is a demand for heat to supply just the correct amount of heat to maintain the building temperature constant, but I have made my control system responsive to the average temperature of the building and not to the temperature of a particular portion of the building. This type of control system like that of Figure 2 may be used where it is impossible to find a location in a building the temperature of which represents the average temperature of the building.

It is to be understood that the specific temperature values used in the description of my invention are for purposes of illustration only, and that other temperature values may be selected as desired. It is also to be understood that my control system may be advantageously applied to refrigerating systems for summer cooling, and would require only reversal of the thermostat control devices. Although I have disclosed various forms of my invention, other forms thereof may become obvious to those skilled in the art, and consequently my invention is to be limited only by the scope of the appended claims and prior art.

I claim as my invention:

1. In a temperature control system, the combination of means for supplying heat to a space, valve means in control of the supply of heat, thermostatic means responsive to space temperatures for controlling said valve means to increase the supply of heat to the space upon a call for heat and to decrease the supply of heat when the thermostatic means is satisfied, the increase and decrease being substantially constant, and means controlled by said thermostatic means for additionally increasing or decreasing the supply of heat in accordance with the per cent of time that the space thermostat is calling for heat or is satisfied.

2. In a temperature control system, the combination of heating means for a building, a controller outside of the building and subject to the same ambient conditions as the building and including heating means and thermostatic means, the thermostatic means controlling both heating means to increase the supply of heat to the building and the controller upon a call for heat and to decrease the supply of heat when the thermostatic means is satisfied, and means controlled by said thermostatic means for additionally increasing and decreasing the supply of heat to the building heating means and the controller heating means in response to the per cent of time that the thermostatic means is calling for heat or is satisfied.

3. In a temperature control system, the combination of electrically operated means for controlling a condition of a temperature changing medium for regulating the temperature in a space, means responsive to a value of said condition, a pair of switching mechanisms operated by said last named means in response to changes in the value of said condition, a space thermostat responding to changes in space temperature, one of said switching mechanisms and said space thermostat controlling said electrically operated means upon a call for a temperature change by said space thermostat, the other of said switching mechanisms being operative to control said electrically operated means when said space thermostat is satisfied and the value of said condition attains a predetermined value, and means controlled by said space thermostat for adjusting said condition responsive means whereby the settings of both switching mechanisms are adjusted.

4. In a temperature control system, the combination of electrically operated means for controlling a condition of a temperature changing medium for regulating the temperature in a space, means responsive to a value of said condition, a pair of switching mechanisms operated by said last named means in response to changes in the value of said condition, a space thermostat responding to changes in space temperature, one of said switching mechanisms and said space thermostat controlling said electrically operated means upon a call for a temperature change by said space thermostat, the other of said switching mechanisms being operative to control said electrically operated means when said space thermostat is satisfied and the value of said condition attains a predetermined value, and means continuously operable in opposite directions to raise or lower the setting of said condition responsive means, said continually operable means being controlled by said space thermostat.

5. In a temperature control system, the combination of heating means for a space, means for regulating the temperature of said heating means, a space thermostat for operating said regulating means to increase the temperature of said heating means a predetermined amount upon a demand for heat, and for decreasing the temperature of said heating means said predetermined amount upon said space thermostat becoming satisfied, and means also controlled by said space thermostat for adjusting said regulating means to further increase or decrease the temperature of said heating means in accordance with the proportion of time during which the space thermostat is calling for heat or is satisfied.

6. In a temperature control system, the combination of heating means for a space, means for regulating the temperature of said heating means, a space thermostat for operating said regulating means to increase the temperature of said heating means a predetermined amount upon a demand for heat, and for decreasing the temperature of said heating means said predetermined amount upon said space thermostat becoming satisfied, and means continuously operated in one direction or the other dependent upon whether the space thermostat is calling for heat or is satisfied for adjusting the controlling means to further increase or decrease the condition of the heating means.

7. In a system for controlling the temperature of a space, a temperature changing medium, means for circulating said temperature changing medium to the space whose temperature is to be controlled, a space thermostat, and means for regulating the temperature changing effect of said medium, said space thermostat upon a demand for a change in temperature causing said last mentioned means to increase the temperature changing effect of said medium a predetermined amount and thereafter continuously increase said effect, said space thermostat upon satisfaction causing said regulating means to decrease said effect a predetermined amount and thereafter continuously decrease said effect.

8. In a heating system for controlling the temperature of a space, a heating means for heating a medium adapted to influence the space temperature, a control device responsive to the temperature of said heating medium for controlling said heating means to maintain the temperature of said heating medium at a certain value, power means for continuously adjusting said control device to steadily increase or decrease said temperature value, and a thermostat responsive to space temperature, said thermostat on an increase in space temperature to a predetermined high value reversing said power means to steadily decrease the temperature of said heating medium, and on a decrease in space temperature to a predetermined lower value again reversing said power means to steadily increase the temperature of said heating medium until the space temperature again reaches said predetermined high value, whereby the average space temperature maintained will be half way between the high and low limits regardless of the load on the heating system.

9. In a heating system for controlling the temperature of a space, a heating device for heating the medium adapted to deliver heat to said space, an electrical fuel burner for delivering heat to said heating device, switching means in control of said fuel burner, thermal means responsive to the temperature of said heating medium actuating said switching means to energize and de-energize said fuel burner to control the temperature of said heating medium, an electric motor connected to said thermal means to continuously adjust it to steadily increase or decrease the temperature of said heating medium, and a space thermostat reversing said motor to steadily increase the temperature of said heating medium when the space temperature decreases to a predetermined low value and to again reverse said motor to steadily decrease the temperature of said heating medium when the space temperature reaches a predetermined high value, whereby the average space temperature maintained will be approximately half way between said high and low values.

10. In a system for controlling a condition, the combination of condition changing means for changing the condition to be controlled, adjustable control means responsive to a condition directly associated with the condition changing means to control the condition changing effect of the condition changing means in accordance with the adjustment of the adjustable control means, means continuously operating in one direction or the other for continuously and gradually adjusting the adjustable control means to increase or decrease the condition changing effect of the condition changing means, and second control means indicative of the value of the condition to be controlled for increasing or decreasing a predetermined amount the condition changing effect of the condition changing means and for controlling the direction of operation of the continuously operating means.

11. In a temperature control system for controlling the temperature of a space, the combination of temperature changing means for changing the temperature of the space, adjustable control means, means responsive to a condition directly associated with the temperature changing means to control the temperature changing effect of the temperature changing means in accordance with the adjustment of the adjustable control means, means continuously operating in one direction or the other for continuously and gradually adjusting the adjustable control means to increase and decrease the temperature changing effect of the temperature changing means, and second control means indicative of the value of the space temperature for increasing or decreasing a predetermined amount the temperature changing effect of the temperature changing means and for controlling the direction of operation of the continuously operating means.

12. In a system for controlling a condition, the combination of a condition changing means for controlling the condition to be controlled, means including control means responsive to a condition directly associated with the condition changing means and control means indicative of the value of the condition to be controlled acting conjointly for increasing a predetermined amount the condition changing effect of the condition changing means upon a demand for an increased condition changing effect, for additionally and gradually increasing the condition changing effect as long as the demand continues, for initially decreasing a predetermined amount the condition changing effect of the condition changing means when the demand becomes satisfied and for additionally and gradually decreasing the condition changing effect of the condition changing means as long as the demand is satisfied.

13. In a temperature control system for controlling the temperature of a space, the combination of temperature changing means for changing the temperature of the space, means including control means responsive to a condition directly associated with the temperature changing means and control means indicative of the value of the space temperature acting conjointly for initially increasing a predetermined amount the temperature changing effect of the temperature changing means upon a demand for an increased temperature changing effect, for additionally and gradually increasing the temperature changing effect as long as the demand continues, for decreasing a predetermined amount the temperature changing effect of the temperature changing means when the demand becomes satisfied and for additionally and gradually decreasing the temperature changing effect of the temperature changing means as long as the demand is satisfied.

14. In a temperature control system for a space, the combination of heating means for the space, electrically operated means controlling the heating effect of the heating means, a pair of current controlling mechanisms for controlling the electrically operated means, thermostatic means indicative of the value of the space temperature operative upon a demand for heat to place one of the current controlling mechanisms in control of the electrically operated means to increase a given amount the heating effect of the heating means and operative when the demand for heat is satisfied to place the other current controlling mechanism in control of the electrically operated means to decrease a given amount the heating effect of the heating means, and means controlled by the thermostatic means to increase additionally and gradually the heating effect of the heating means as long as the thermostatic means is demanding heat and to decrease additionally and gradually the heating effect of the heating means as long as the demand for heat by the thermostatic means is satisfied.

15. In a temperature control system for a space, the combination of heating means for the space, electrically operated means controlling the heating effect of the heating means, a pair of current controlling mechanisms for controlling the electrically operated means, thermostatic means indicative of the value of the space temperature operative upon a demand for heat to place one of the current controlling mechanisms in control of the electrically operated means to increase a given amount the heating effect of the heating means and operative when the demand for heat is satisfied to place the other current controlling mechanism in control of the electrically operated means to decrease a given amount the heating effect of the heating means, and means controlled by the thermostatic means for adjusting the current controlling mechanisms to increase additionally and gradually the heating effect of the heating means as long as the thermostatic means is demanding heat and to decrease additionally and gradually the heating effect of the heating means as long as the demand for heat by the thermostatic means is satisfied.

16. In a temperature control system, the combination of electrically controlled temperature changing means for changing the temperature of a heat exchange medium, temperature responsive means responsive to the temperature of said heat exchange medium, a pair of switching mechanisms operated by said temperature responsive means in response to changes in the temperature of said heat exchange medium, a space thermostat responsive to changes in temperature of a space whose temperature is being controlled by said heat exchange medium, one of said switching mechanisms and said space thermostat controlling the temperature changing means upon a call for a temperature change by said space thermostat, the other of said switching mechanisms controlling the temperature changing means when the space thermostat is satisfied, and means controlled by the space thermostat for adjusting said temperature responsive means whereby the settings of both switching mechanisms are adjusted.

17. In a heating system, the combination of heating means for raising the temperature of a heating medium to be supplied to a space, temperature responsive means responsive to the temperature of the heating medium, a low limit control means and a high limit control means for the heating means operated by said temperature responsive means, a space thermostat responding to changes in space temperature, means responsive to a call for heat by the space thermostat for placing the heating means under the control of the high limit control, means responsive to the space thermostat becoming satisfied for placing the heating means solely under the control of the low limit thermostat, and means controlled by said space thermostat for continuously raising the setting of the high limit control upon a call for heat and for continuously lowering the setting of the low limit control when the space thermostat is satisfied.

WILLIAM L. McGRATH.